United States Patent
Chasen et al.

(10) Patent No.: US 6,509,549 B1
(45) Date of Patent: Jan. 21, 2003

(54) OVEN AND ROTISSERIE

(75) Inventors: James E. Chasen, West Haven, CT (US); Charles Z. Krasznai, Bridgeport, CT (US); Michael J. Otterman, New Haven, CT (US); James A. Sandor, Trumbull, CT (US); Paul F. Garneau, East Haven, CT (US)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/993,464

(22) Filed: Nov. 14, 2001

(51) Int. Cl.[7] ............................. A47J 37/04; A21B 1/40
(52) U.S. Cl. ...................... 219/386; 219/392; 219/413; 99/421 H
(58) Field of Search ................................ 219/386, 388, 219/392, 411, 413, 494; 99/421 H, 331

(56) References Cited

U.S. PATENT DOCUMENTS

| | | |
|---|---|---|
| 1,083,994 A | 1/1914 | Darnieder |
| 2,624,111 A | 1/1953 | Weeks |
| 2,821,905 A | 2/1958 | Culligan |
| 3,194,149 A | 7/1965 | Schibley |
| 3,217,635 A | 11/1965 | Scavullo |
| 3,333,530 A | 8/1967 | Reuther ................ 99/339 |
| 3,333,531 A | 8/1967 | Reuther |
| 3,483,816 A | 12/1969 | Lombardi |
| 3,848,522 A * | 11/1974 | Trelc ................ 99/421 H |
| 4,286,133 A | 8/1981 | Einset et al. ........... 219/10.55 F |
| 4,369,697 A | 1/1983 | Millington ............ 99/351 |
| 4,392,038 A * | 7/1983 | Day et al. ............ 219/738 |
| 4,476,848 A * | 10/1984 | Protas ............... 219/392 |
| 4,539,751 A | 9/1985 | Chan ................. 30/322 |
| 4,717,802 A | 1/1988 | Colato ............... 219/10.55 E |
| 4,810,856 A | 3/1989 | Jovanovic ............ 219/401 |
| 4,985,607 A | 1/1991 | Oya ................. 219/10.55 E |
| 5,193,443 A | 3/1993 | Carney .............. 99/419 |
| 5,361,686 A | 11/1994 | Koopman ............ 99/421 H |
| 5,451,744 A | 9/1995 | Koopman et al. ...... 219/400 |
| 5,485,780 A | 1/1996 | Koether et al. ....... 99/419 |
| 5,490,451 A * | 2/1996 | Nersesian ........... 99/420 |
| 5,536,518 A | 7/1996 | Rummel ............. 426/523 |
| 5,598,769 A | 2/1997 | Luebke et al. ....... 99/395 |
| 5,649,475 A * | 7/1997 | Murphy et al. ....... 99/421 H |
| 5,786,568 A * | 7/1998 | McKinney ........... 219/400 |
| 5,801,362 A | 9/1998 | Pearlman et al. ..... 219/400 |
| 5,889,259 A | 3/1999 | Krasznai et al. ..... 219/414 |
| 5,918,534 A | 7/1999 | Medina ............. 99/342 |
| 5,948,305 A | 9/1999 | Petrides et al. ..... 219/519 |
| 6,060,698 A | 5/2000 | Petrides et al. ..... 219/492 |
| 6,069,344 A | 5/2000 | Krasznai et al. ..... 219/400 |
| 6,080,967 A * | 6/2000 | Sandor et al. ....... 219/413 |
| 6,142,064 A * | 11/2000 | Backus et al. ....... 99/421 H |
| 6,240,838 B1 * | 6/2001 | Backus et al. ....... 99/421 H |

* cited by examiner

Primary Examiner—Joseph Pelham (57) ABSTRACT

An electric oven having a frame; top heating elements connected to the frame; a control connected to the heating elements; a food support rack removably connected to the frame between the top heating elements and a bottom of the frame; a drive comprising a motor connected to the frame; and a rotisserie skewer removably connected to the drive. The rotisserie skewer is located between the top heating elements and the bottom of the frame. The control has an oven temperature and broil selector, and a timer selector.

15 Claims, 7 Drawing Sheets

OVEN AND ROTISSERIE

BACKGROUND OF THE INVENTION

1. Field of the Invention

The present invention relates to ovens and, more particularly, to a combined oven and rotisserie.

2. Prior Art

Portable electric rotisserie ovens are well known in the art. For example, U.S. Pat. No. 5,801,362 discloses one type of portable electric rotisserie oven. However, most existing rotisserie ovens are large dedicated units which take up a lot of room and can only perform a rotisserie function. In addition, most of these rotisserie ovens are cumbersome and complicated to use.

Electric toaster ovens are generally well known in the art. For example, Applica Consumer Products, Inc. sells an electronic toaster oven broiler under the model number TR06100CT which includes a removable food support rack, and a control system with a broil/oven temperature selector, a toast light/dark selector, and a timer selector. However, existing electric toaster ovens are not adapted to provide a rotisserie function.

Rotisserie skewer prong assemblies in the past have been usually held in position by a screw-down mechanism. Such screw-down mechanisms can be hard to use due to contamination of the threads with grease or food, cross threading the assembly, or possibly losing the locking screw; making locking impossible.

Food temperature probes are usually stored in a kitchen drawer and often become displaced or broken. Monitoring cavity temperature for a small rotisserie oven is usually not done due to the complication and expense to make this practical.

SUMMARY OF THE INVENTION

In accordance with one aspect of the present invention, an electric oven is provided having a frame; top heating elements connected to the frame; a control connected to the heating elements; a food support rack removably connected to the frame between the top and bottom; a drive comprising a motor connected to the frame; and a rotisserie skewer removably connected to the drive. The rotisserie skewer is located between the top heating elements and the bottom. The control has an oven temperature and broil selector, and a timer selector.

In accordance with another aspect of the present invention, an oven rotisserie skewer assembly is provided comprising a skewer rod adapted to be located in a heating area of an oven rotisserie with opposite ends connected to opposite lateral sides of the heating area; and an end skewer member mounted to the skewer rod. The end skewer member comprises multiple skewer spikes and a leaf spring retainer. The leaf spring retainer has a deflectable cantilevered section with a hole therethrough. The skewer rod extends through the hole. A side of the hole is biased against the skewer rod to frictionally retain the end skewer member on the skewer rod.

In accordance with another aspect of the present invention, an electric oven is provided comprising a frame forming a cooking area; heating elements connected to the frame in the cooking area; a control connected to the heating elements; and a food temperature probe adapted to be inserted into food. The food temperature probe is removably connected to the frame. When the temperature probe is connected to the frame, and not directly connected to food, the temperature probe is adapted to indicate temperature in the cooking area.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
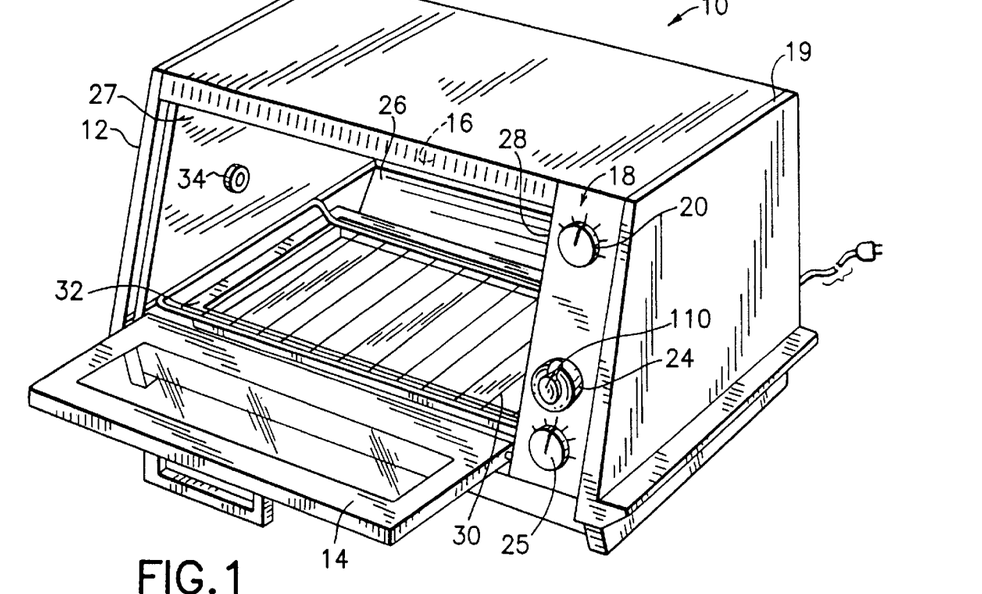
FIG. 1 is a perspective view of an oven rotisserie incorporating features of the present invention shown with its removable food rack.
Figure 2:
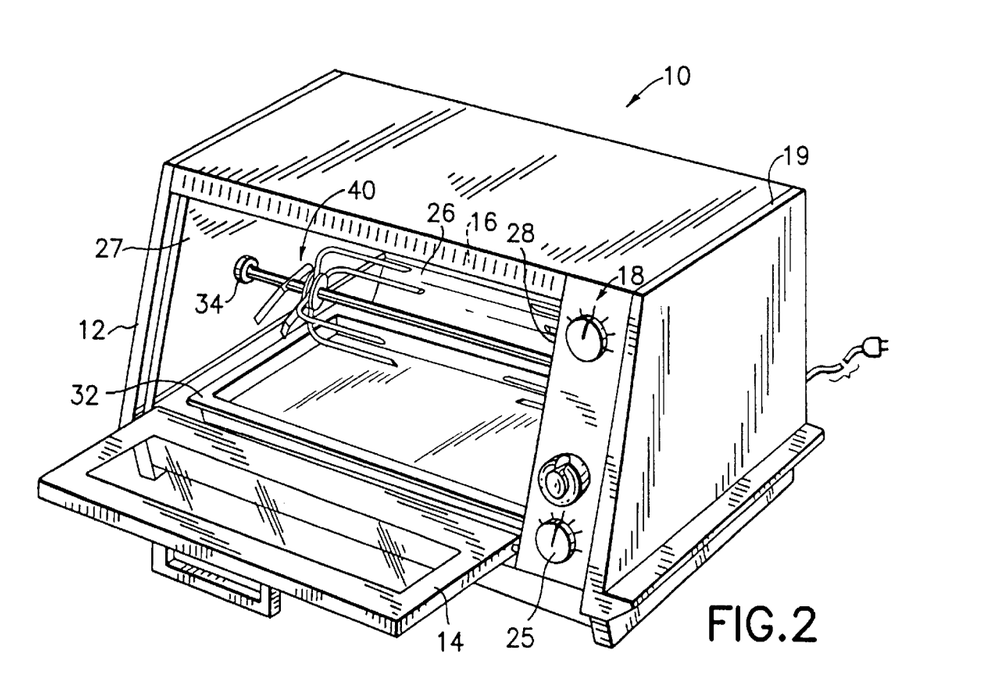
FIG. 2 is a perspective view of the oven rotisserie shown in FIG. 1 with the food rack removed and its rotisserie skewer shown located in the food cooking area.

Referring to FIGS. 1 and 2, there is shown perspective views of an electric oven rotisserie 10 incorporating features of the present invention. FIG. 1 shows the oven 10 in a first configuration for broiling. FIG. 2 shows the oven 10 in a second configuration for rotisserie cooking. Although the present invention will be described with reference to the single embodiment shown in the drawings, it should be understood that the present invention can be embodied in many alternate forms of embodiments. In addition, any suitable size, shape or type of elements or materials could be used.

The oven 10 generally comprises a housing 12, a door 14, heating elements 16, a control system 18, a food support rack 30 (see FIG. 1) and a rotisserie skewer assembly 40 (see FIG. 2). In the embodiment shown, the control system 18 is located at a lateral side of the housing 12. However, in alternate embodiments, the control system could be located at any suitable location(s) on the housing. The control system 18 includes user actuatable controls at a front side of the housing 12. In the embodiment shown, the user actuatable controls include an ON/OFF broil/oven temperature selector knob 20, and a timer selector knob 25. However, in alternate embodiments, the oven 10 could comprise fewer, or additional, or alternative components. In addition, the selectors could comprise any suitable type of user actuatable selectors.

In the embodiment shown, the door 14 is pivotably mounted to the frame 12 at a bottom end of the door. However, in alternate embodiments, any suitable type of mounting of the door to the frame could be provided. In the embodiment shown, the frame 12 and the door 14 can be substantially identical to that of a conventional toaster oven, such as the frame and door of the Applica Consumer Products, Inc. electronic toaster oven broiler model number TR06100CT. The frame 12 and the door 14 form a food cooking area 26. The frame 12 includes walls 27, 28 which form the lateral sides of the food cooking area 26. The inner sides of the walls 27, 28 include support shelves for slidably supporting a food support rack 30 thereon. The wall 27 includes a spring loaded rotisserie skewer assembly support 34. The wall 28 includes a hole 36 (see FIG. 5) therethrough. The hole 36 is located directly opposite the support 34.

When the oven 10 is in the first configuration, the food support rack 30 is removably slidably located on the support shelves. Thus, the support rack 30 can be removed from the food cooking area 26 for cleaning or for reconfiguration to the second configuration shown in FIG. 2.

In the embodiment shown, the heating elements 16 comprise top heating elements located at the top side of the food cooking area 26. In a preferred embodiment, the heating elements comprise Calrods. However, in alternate embodiments, any suitable type of heating elements or arrangement of the heating elements in the food cooking area could be provided. The food support rack 30 is located between the top heating elements and the bottom of the food cooking area.

In the embodiment shown, the oven 10 also comprises a tray 32. The tray 32 is located on the bottom side of the food cooking area 26. The tray 32 is removably located in the food cooking area 26. In this embodiment, the tray 32 has raised side edges to form a pan-like shape. The tray 32 can function both as a crumb tray and as a grease pan. However, in alternate embodiments, any suitable type of crumb tray and/or grease pan could be provided. Alternatively, the tray 32 might not be provided.

Figure 3:
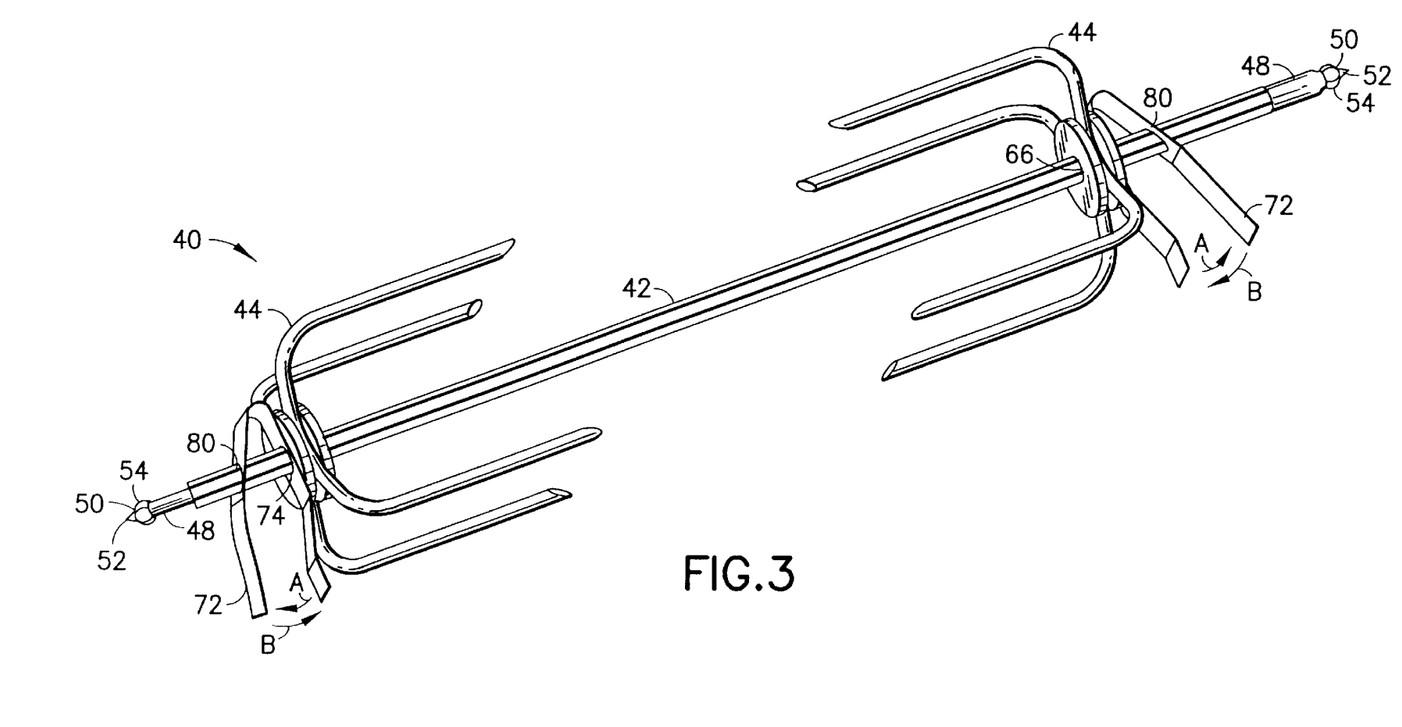
FIG. 3 is a perspective view of the rotisserie skewer shown in FIG. 2.
Figure 10:
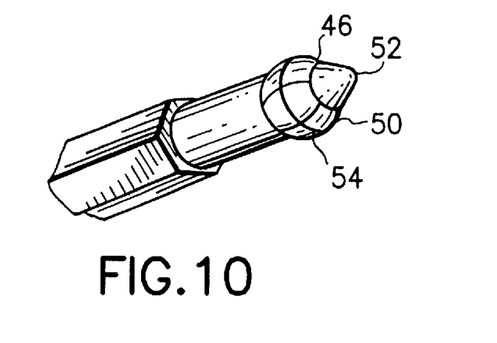
FIG. 10 is an enlarger perspective view of the right side of the skewer rod.

As noted above, FIG. 2 illustrates the oven 10 in its second configuration. Referring also to FIG. 3, this second configuration generally comprises the food support rack 30 having been removed from the food cooking area 26 and the rotisserie skewer assembly 40 having been installed into the food cooking area 26. The rotisserie skewer assembly 40 generally comprises a skewer rod 42 and two end skewer members 44. The skewer rod 42 has a polygonal exterior surface along a majority of its length. The opposite ends 46 of the skewer rod 42 are substantially identical to each other. In an alternate embodiment, the opposite ends of the skewer rod 42 might have different shapes. Referring also to FIG. 10, each end 46 has a section 48 with a circular outer perimeter and a section 50. Each section 50 has a pointed or rounded tip 52 and a keyed section 54. In the embodiment shown, the keyed section 54 comprises a polygonal exterior surface similar to the majority of the rod's length, such as a hexagon for a hex ball drive mechanism 96. In an alternate embodiment, the skewer rod 42 could comprise any suitable type of shape or ends.

In this embodiment, the two end skewer members 44 are substantially identical to each other. However, in alternate embodiments, the rotisserie skewer assembly 40 could have different types of skewer members. In this embodiment, the two end skewer members 44 are selectively movable on the skewer rod 42. In one type of alternate embodiment the rotisserie skewer assembly 40 might comprise only one movable end skewer member; the rotisserie skewer rod having fixed skewer spikes thereon opposite the one movable end skewer member.

Figure 4:
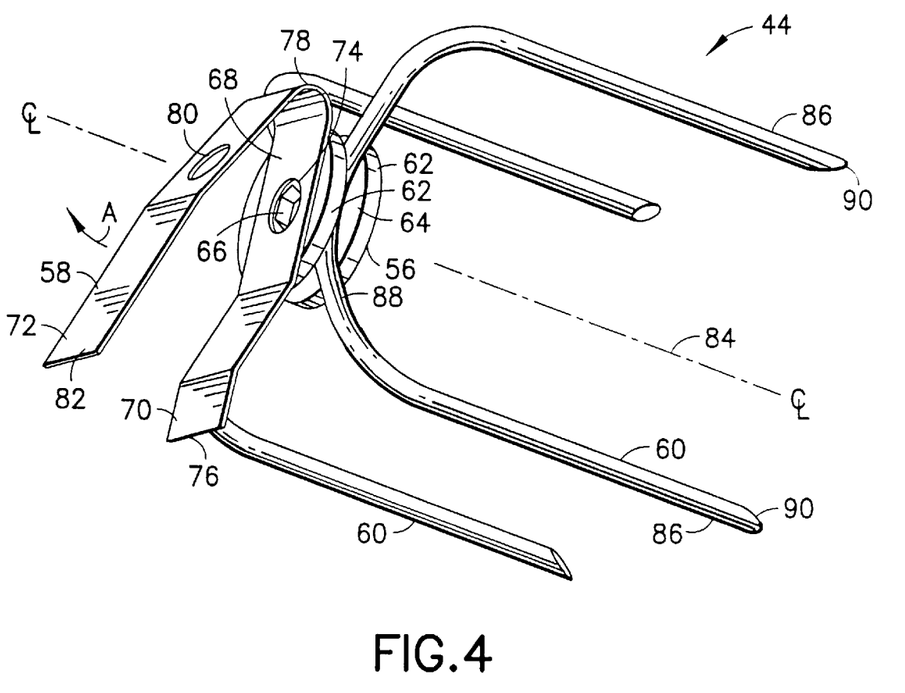
FIG. 4 is a perspective view of one of the end skewer members of the rotisserie skewer shown in FIG. 3.

Referring also now to FIG. 4, one of the end skewer members 44 is shown. In this embodiment, the end skewer member 44 generally comprises a base 56, a leaf spring retainer 58, and two skewer spikes 60. The base 56 generally comprises two ring member sections 62 which form an annular groove 64 therebetween. The two ring member sections 62 each comprise a center aperture 66 therethrough. In this embodiment, the center apertures 62 have a polygonal shape which substantially matches the polygonal shape of the skewer rod 42. The center apertures 66 are sized and shaped to slidingly receive the skewer rod 42 therein. The shapes of the center apertures 66 and the skewer rod 42 form an interlocking slidable connection between the end skewer members 44 and the skewer rod 42. The interlocking connection provided by the polygon shapes prevent the members 44 from axially rotating on the rod 42. In alternate embodiments, any suitable type of movable connection between the base 56 of the end skewer members 44 and the skewer rod 42 could be provided. The keyed section 54 provides an interlocking connection with the drive 96 to allow the drive to axially rotate the rod 42.

The leaf spring retainer 58 is mounted to one side of the base 56. In this embodiment the retainer 58 comprises a one-piece member comprised of spring steel. However, in alternate embodiments, the retainer 58 could be comprised of multiple members and could be comprised of any suitable type of material(s). In the embodiment shown, the retainer 58 comprises a first section 68, a second section 70, and a third section 72.

The first section 68 is fixedly attached to the base 56. The first section 68 comprises a hole 74 therethrough. The hole 74 is aligned with the apertures 66. The second section 70 extends in a general cantilevered fashion from the first section 68 and forms a finger contact and support area 76. The third section 72 also extends from the first section 68 in a general cantilevered fashion. However, the third section 62 comprises a bend 78 of about 140 degrees. The third section 72 includes a hole 80 and a finger contact area 82. The hole 80, when not attached to the rod 42, is partially offset from the centerline axis 84 of the hole 74 and apertures 66.

Because the retainer 58 is comprised of spring steel, the third section 72 can be resiliently deflected towards the first and second sections 68, 70. More specifically, a user can pinch the two finger contact areas 76, 82 towards each other with the third section 72 deflecting towards the second section 70. When the third section 72 is deflected towards the second section 70, the hole 80 can be moved into alignment with the centerline axis 84. When the user releases the pinching force between the two finger contact areas 76, 82, the third section 72 can deflect upward and outward as indicated by arrow A to move the hole 80 at least partially out of alignment with the center line axis 84. In an alternate embodiment, any suitable type of retainer could be connected to the base 56.

The skewer spikes 60 are fixedly attached to the base 56 in the annular groove 64. In this embodiment the end skewer member 44 comprises two of the skewer spikes 60. However, in alternate embodiments, the end skewer member could comprise more or less than two skewer spikes. Each skewer spike, in the embodiment shown, generally comprises a one-piece metal rod bent into a general U-shaped profile. The general U-shaped profile forms two spike members 86 and a mounting section 88 which connects the two spiked members 86 to each other. The mounting section 88 is fixedly mounted to the base 56 inside the annular groove 64. In an alternate embodiment, the skewer spikes could be integrally formed with the base. In another alternate embodiment, the spike members could be individual pieces connected to the base. The two spike members 86 extends forward from the base 56 and comprise pointed tips 90. In an alternate embodiment, any suitable type of end skewer member could be provided on the skewer rod.

Referring back to FIG. 3, when the end skewer members 44 are connected to the skewer rod 42 the rod passes through the apertures 66 and holes 74, 80. In order to pass the rod 42 through the hole 80, the third sections 72 must be deflected slightly inward as shown by arrows B. After being located on the rod 42, the third sections 72 can be released. The third sections 72 then deflect outward as indicated by arrows A. This causes a surface inside the holes 80 to be biased against the rod 42. This contact, and the contact of the end skewer member with the rod 42 in the apertures 66, cause a frictional retainment of the end members 44 at fixed locations on the rod 42. However, the attachment of the end members 44 on the rod 42 is movable. Therefore, the end members 44 can be adjustably moved on the rod 42 to any desired position to accommodate different sizes of food articles to be held by the skewer assembly 40.

In order to adjust the position of the end skewer members 44 on the rod 42, a user can merely pinch or otherwise move the third section 72 towards the second section 70. This causes the inside surface of the hole 80 to move out of a stationary frictional retainment with the rod 42. The end member can then be slid along the rod 42 to a desired position. Once the end member 44 has been positioned at its desired new location on the rod 42, the user can release the third section 72. The inherent spring force in the retainer 58 biases the third section 72 back into engagement with the rod 42 at the hole 80 to thereby once again fixedly attached the end member 44 to the rod 42 at a stationary, but adjustable position. In an alternate embodiment any suitable type of rotisserie skewer assembly could be provided.

Figure 6:
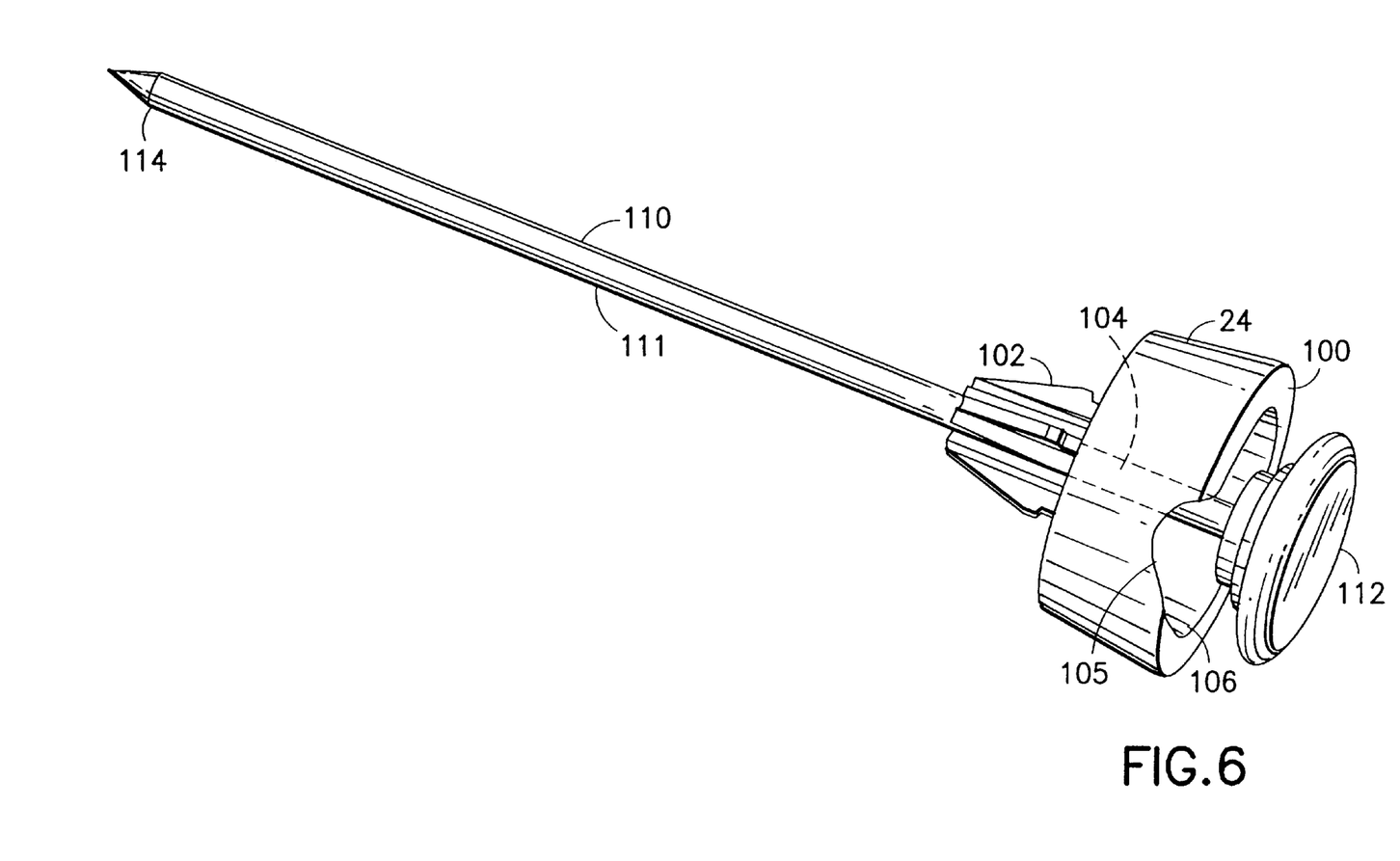
FIG. 6 is a perspective view of the food temperature probe shown in FIG. 5.

Referring also now to FIG. 6, some of the components of the control system 18 are shown. In the embodiment shown, the control system 18 generally comprises an oven control switch assembly 90, an oven control thermostat (not shown), a timer 94, a drive 96, and a printed circuit board 98. In alternate embodiments, the control system could comprise additional, fewer, or alternative components. The oven control thermostat and the oven control switch assembly 90 are preferably similar to that described in U.S. Pat. No. 5,889, 259 which is hereby incorporated by reference in its entirety. However, in alternate embodiments, any suitable type of oven control thermostat or oven control switch assembly could be provided. The switch assembly 90 is connected to the ON/OFF broil/oven temperature selector knob 20 (see FIG. 1). The switch assembly 90 is connected to the oven control thermostat (not shown) which, in turn, is connected to the heating elements 16.

The drive 96 is located at the hole 36. The drive could comprise a drive transmission 97 and an electric motor 99, or merely an electric motor adapted to be directly connected to an end section 50 of the skewer assembly 40. The end section 50 can be passed through the hole 36 and be connected to the drive transmission 97. In an alternate embodiment, the drive transmission could extend through the hole 36.

Figure 8:
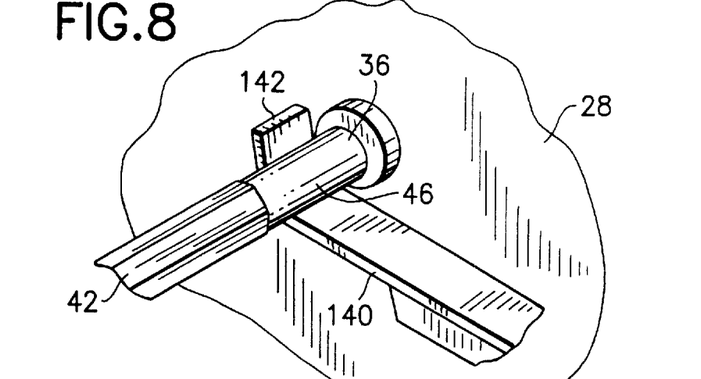
FIG. 8 is a partial perspective view of the skewer rod mounting inside the food cooking area.

Referring also to FIG. 8, the wall 28 in the food cooking area 26 has a rail 140 that extends below the hole 36. The rail 140 has a raised stop 142 at its rear end. The rail forms a guide to slide the end 46 of the skewer rod 42 into alignment with the hole 36 for inserting the end 46 into the hole 36. However, in alternate embodiments, any suitable type of guide of support for the end 46 of the skewer rod before the end is inserted into the hole 36 could be provided.

The timer 94 is connected to the timer selector knob 25. The timer 94 is connected to the printed circuit board 98. In a preferred embodiment the timer 94 can be set up to 90 minutes. In alternate embodiments the timer could be adapted to be set to any suitable time limit. In one type of alternate embodiment, the timer could comprise a digital electronic timer, such as having an electronic keypad connected to the printed circuit board 98, rather than the mechanical timer shown. After passage of the set time, the printed circuit board 98 can automatically turn OFF the oven 10. In an alternate embodiment, the timer might not be provided.

The front end 100 of the temperature probe holder 24 is adapted to extend from the front face of the frame 12 at the control housing section 19 of the frame. Referring also to FIG. 6, the temperature probe holder 24 comprises an aperture 104 which extends through the front and rear ends 100, 102. The aperture 104 forms a recessed pocket or receiving area 106 at the front end 100. In the embodiment shown, the front end 100 includes a finger groove 108 through a lateral side of the front end into the recessed pocket 106.

The oven 10, in the embodiment shown, comprises a food temperature probe 110. However, in an alternate embodiment, the food temperature probe might not be provided. In this embodiment the food temperature probe 110 generally comprises a shaft 111 and a temperature indicator section 112. However, in alternate embodiments, the food temperature probe could have additional or alternative components, or could have any suitable size and shape. The end 114 of the shaft 111 is adapted to be inserted into food. The temperature indicator section 112 is adapted to indicate to a user a temperature sensed at the end 114 of the shaft.

In the embodiment shown, the food temperature probe 110 is removably connected to the frame 12 of the oven 10. As shown best in FIG. 5, the frame 12 has a receiving area for removably receiving the probe 110. This receiving area is located at the control section 18. However, in alternate embodiments, the food temperature probe receiving area could be located at any suitable area on the oven. The food temperature probe receiving area performs two functions. First, it functions as a storage area for the food temperature probe when the probe is not connected to food. Second, it functions as an area for connecting the food temperature probe to a heat transfer member to allow the food temperature probe to function as a temperature indicator for the temperature inside the food cooking area 26. However, in an alternate embodiment, the second function of allowing the food temperature probe to function as a temperature indicator for the food cooking area might not be provided.

Figure 5:
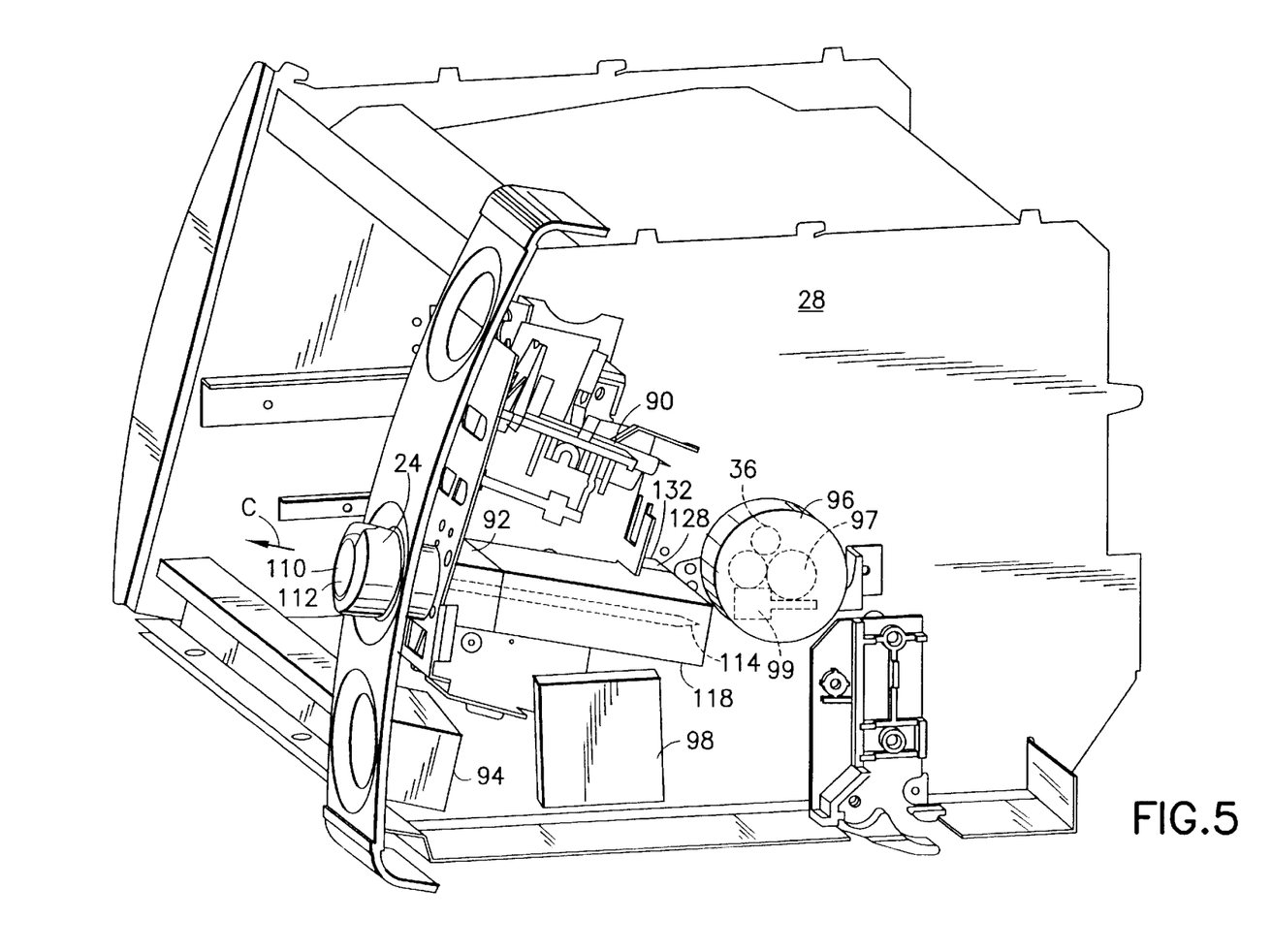
FIG. 5 is a perspective view of some of the control system components of the oven rotisserie shown in FIGS. 1 and 2.
Figure 7:
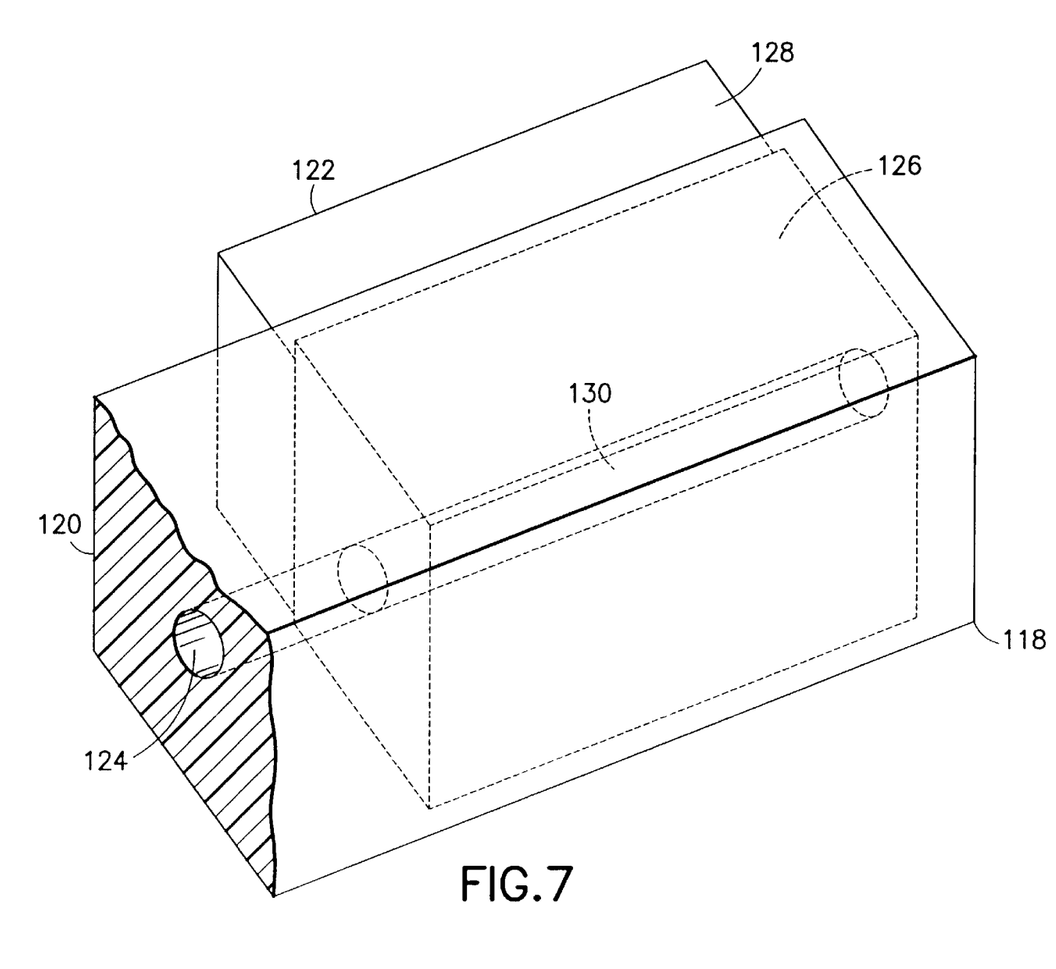
FIG. 7 is a perspective cutaway section of the insulator for the temperature probe shown in FIG. 5 and showing the heat transfer member.

Referring principally to FIG. 5, an insulator and heat transfer assembly 118 is located behind the temperature probe holder 24. Referring also to FIG. 7, the assembly 118 generally comprises a housing member 120 and a heat transfer member 122. The housing member 120 is preferably comprised of heat insulating material. However, in alternate embodiments, the housing member 120 could be comprised of any suitable type of material. In another alternate embodiment, the housing member 120 might not be provided. In this embodiment, the housing member 120 has a hole 124 along its length. Hole 120 is suitably sized and shaped to receive the shaft 111 of the food temperature probe 110 therein.

The heat transfer member 122 is located at the end of the housing member 120. The transfer member 122 is comprised of a suitable heat transfer material, such as metal. However, in alternate embodiments, the heat transfer member could be comprised of any suitable type of material(s). The heat transfer member 122 generally comprises a first section 126 and a second section 128. The first section 126 is encapsulated by the end of the housing member 120. However, in an alternate embodiment, the first section 126 might not be encapsulated. It could be merely connected to the end of the housing member 120. In this embodiment, the first section 126 comprises a receiving area 130. The receiving area 130 is suitably sized and shaped to matingly receive the end 114 of the probe 110. When the end 114 is located in the receiving area 130, contact between the end 114 and the heat transfer member 122 forms a good thermal transfer connection between the two members.

The second section 128 of the transfer member 122 extends out of the housing member 120 at a lateral side of the housing member. In a preferred embodiment, the wall 28 comprises a hole 132 (see FIG. 5). The second section 128 of the heat transfer member 122 extends through the hole 132 into the food cooking area 26. Therefore, the second section 128 is directly exposed to temperature inside the food cooking area 26. In an alternate embodiment, the second section 128 could be connected to sense temperature inside the food cooking area 26 by an intermediate component, such as the wall 28 itself for example. When the food temperature probe 110 is connected to the oven 10 as shown in FIG. 5, its end 114 is thermally connected to the heat transfer member 122. Therefore, the temperature probe 110 can indicate the temperature inside the food cooking area 26 at the temperature indicator section 112.

The food temperature probe 110 can be slidingly removed from its connection with the oven 10 by merely pulling outward on the temperature indicator section 112 as indicated by arrow C. The finger groove 108 provides an area for a user's finger to be initially located behind the back side of the temperature indicator section 112. A user can then insert the end 114 of the probe 110 into food in order to measure the temperature of the food. When a user is finished, the user can merely wipe off the end 114 and insert the probe 110 back into its receiving area in the oven. The probe 110 merely slides through the knob 22, thermostat 92, and assembly 118 back to its home storage position. In an alternate embodiment, any suitable means for storing the temperature probe could be provided. In addition, any suitable type of member or members could be provided for transferring heat from the food cooking area 26 to the food temperature probe.

Figure 9:
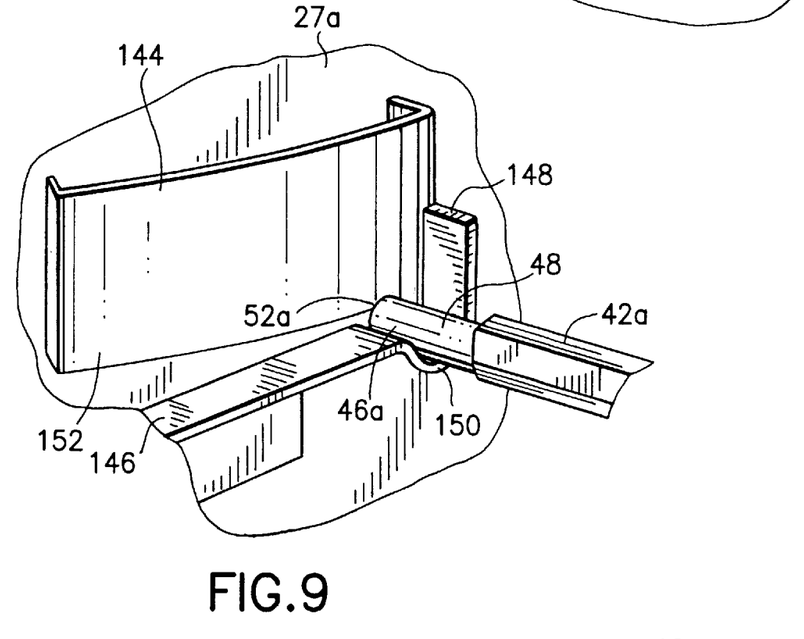
FIG. 9 is a partial perspective view of an alternate mounting of a left side of a skewer rod to the opposite side of the food cooking area.

Referring now to FIG. 9, an alternate embodiment of the left end 46a of a skewer rod 42a and the left wall 27a is shown. In this embodiment, the left end 46a has a rounded section 48, but a flat tip 52a. The left wall 27a comprises a spring 144 and a guide 146. The guide 146 includes a raised stop section 148 at its end and a trough 150. The guide 146 forms a guide for supporting the end 46a for sliding the end 46a into the trough 150.

The guide 146 also supports the weight of the rod 42a, and food thereon, at the left wall 27a. The trough 150 forms an area for rotatably supporting the end 46a thereat. The spring presses against the tip 52a to bias the rod 42a towards the opposite wall of the cooking area. The spring 144 has a wedge shaped lead-in surface 152 to guide the rod 42a into its position in the trough 150 and to guide the rod's opposite end into the hole 36 in the right side of the cooking area. In alternate embodiments, any suitable type of skewer rod mounting could be provided.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electric oven comprising:
    a frame;
    top heating elements connected to the frame;
    a control connected to the heating elements, the control comprising an oven temperature and broil selector, and a timer selector;
    a food support rack removably connected to the frame between the top heating elements and a bottom of the frame;
    a drive comprising a motor connected to the frame;
    a rotisserie skewer removably connected to the drive, the rotisserie skewer being located between the top heating element and the frame bottom;
    said frame comprising a food probe mounting area for removably storing a food temperature probe therein; and
    a heat transfer member connected to the frame and extending between a food heating area of the frame and the food probe mounting area.

2. An electric oven as in claim 1 wherein the frame comprises a control section at a lateral section of the frame, the control and the drive being located in the control section.

3. An electric oven as in claim 2 wherein the frame comprises a door located at a front side of the frame, and the selectors are located at the front side of the frame at the lateral section.

4. An electric oven as in claim 1 wherein the frame forms a food heating area and a control housing area separated from each other by a wall on a lateral side of the food heating area, and wherein the wall comprises a hole therethrough, the drive being located in the control housing area at the hole with an end of the rotisserie skewer extending through the hole into the drive.

5. An electric oven as in claim 1 wherein the rotisserie skewer comprises a skewer rod and two end skewer members movably mounted to the rod.

6. An electric oven as in claim 5 wherein the skewer rod has a polygonal exterior surface along a majority of its length.

7. An electric oven as in claim 5 wherein at least one of the end skewer members comprises multiple skewer spikes and a leaf spring retainer.

8. An electric oven as in claim 7 wherein the leaf spring retainer has a deflectable cantilevered section with a hole therethrough, the skewer rod extending through the hole, and wherein a side of the hole is biased against the skewer rod to frictionally retain the end skewer member on the skewer rod.

9. An electric oven as in claim 8 wherein the end skewer member further comprises two ring member sections having center apertures therethrough and forming a groove therebetween, and wherein the skewer spikes have portions sandwiched between the ring member sections in the groove, and wherein the skewer rod is slidably located in the center apertures.

10. An electric oven as in claim 8 wherein the end skewer member further comprises a base slidably located on the skewer rod, and the leaf spring retainer comprises a section fixedly mounted to the base.

11. An electric oven as in claim 10 wherein the leaf spring retainer comprises a support section extending from the base opposite an end of the deflectable cantilevered section, wherein a user can pinch the cantilevered section and the support section towards each other to move the cantilevered section off of frictional retainment with the skewer rod.

12. An electric oven comprising:

a frame forming a cooking area;

heating elements connected to the frame in the cooking area;

a control connected to the heating elements; and a food temperature probe adapted to be inserted into food, the food temperature probe being removably connected to the frame, wherein when the temperature probe is connected to the frame and not directly connected to food, the temperature probe is adapted to indicate temperature in the cooking area.

13. An electric oven as in claim 12 wherein the frame comprises a food probe mounting area for removably slidably storing the food temperature probe therein.

14. An electric oven as in claim 13 further comprising a heat transfer member connected to the frame and extending between the cooking area and the food probe mounting area.

15. An electric oven comprising:

a frame;

heating elements connected to the frame;

a control system for controlling the heating elements, the control system comprising a user interactive control section of the frame having an oven temperature selector;

a food temperature probe adapted to be inserted directly into food, the food temperature probe being removably connected to the frame at the user interactive control section of the frame;

said interactive control section comprises a food probe mounting area for removably slideably storing the food temperature probe therein; and a heat transfer member connected to the frame and extending between a food cooking area and the food probe mounting area.

* * * * *